United States Patent [19]

Vivaldi

[11] Patent Number: 4,932,767
[45] Date of Patent: Jun. 12, 1990

[54] BALANCED MOMENT LASER MIRROR COOLING DEVICE

[75] Inventor: Alexander Vivaldi, West Palm Beach, Fla.

[73] Assignee: The United States of America as represented by the Secretary of the Air Force, Washington, D.C.

[21] Appl. No.: 384,940

[22] Filed: Jul. 25, 1989

[51] Int. Cl.5 .............................................. G02B 5/08
[52] U.S. Cl. ..................................... 350/610; 350/609
[58] Field of Search ....................... 350/607, 609, 610

[56] References Cited

U.S. PATENT DOCUMENTS

| | | | |
|---|---|---|---|
| 3,637,296 | 1/1972 | McLafferty et al. | |
| 3,854,799 | 12/1974 | Sciacca et al. | |
| 3,854,800 | 12/1974 | Dye et al. | |
| 3,861,787 | 1/1975 | Locke et al. | 350/610 |
| 3,923,383 | 12/1975 | Engel et al. | |
| 3,926,510 | 12/1975 | Locke et al. | 350/610 |
| 3,932,029 | 1/1976 | Weiss | 350/610 |
| 3,942,880 | 3/1978 | Zeiders, Jr. | 350/609 |
| 3,986,768 | 10/1976 | Peters et al. | |
| 4,431,257 | 2/1984 | Born | |
| 4,821,282 | 4/1989 | Podgorski | 350/609 |

Primary Examiner—Rodney B. Bovernick
Assistant Examiner—J. Patrick Ryan
Attorney, Agent, or Firm—Robert L. Nathans; Donald J. Singer

[57] ABSTRACT

Laser mirror mounting device having a centralized mounting plane including a mirror mounted upon the mounting device, offset from the mounting plane, a coolant port and a coolant passageway for conducting coolant therethrough to draw heat from the mirror, together with a coolant manifold coupled between the coolant port and the coolant passageway, such manifold having a configuration symmetrical about the centralized mounting plane, for substantially eliminating coolant induced bending moments about the centralized mounting plane.

20 Claims, 1 Drawing Sheet

BALANCED MOMENT LASER MIRROR COOLING DEVICE

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of cooled laser mirrors and more particularly to coolant manifolds utilized therein.

Optimized performance of cooled laser mirrors depends upon the ability to minimize pressure induced and thermally induced distortions. Current coolant distribution manifold configurations provide a center of pressure that is offset with respect to the mirror mounting plane which is typically at the center of gravity of the mirror mounting device. This offset, in the direction of the mirror, causes a bowing distortion of the optical surface when the mirror is pressurized with coolant which is typically water.

It is thus an object of the present invention to provide a laser mirror mounting device having a coolant manifold configuration which eliminates the bending moments about the mounting plane to in turn eliminate the bowing of the mirror which would otherwise be produced by such bending moments.

SUMMARY OF A PREFERRED EMBODIMENT OF THE INVENTION

The aforesaid objectives are met by providing a coolant manifold coupled between the coolant port and the coolant passageway positioned beneath the mirror, such cooling manifold having a configuration which is symmetrical about the centralized mirror mounting plane to substantially eliminate coolant induced bending moments about the centralized mounting plane to in turn eliminate mirror surface distortions which would otherwise occur.

BRIEF DESCRIPTION OF THE DRAWINGS

Other objects, features and advantages of the present invention will become apparent upon study of the following detailed description taken in conjunction with the drawings in which.

DETAILED DESCRIPTION OF PREFERRED EMBODIMENTS OF THE INVENTION

Figure 1:
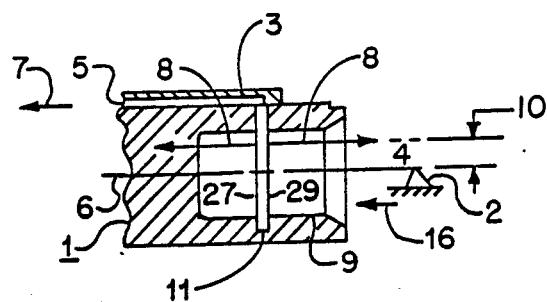
FIG. 1 illustrates a partial cross sectional view of the aforesaid prior art structure.

Referring now to the prior art laser mirror mounting device illustrated in FIGS. 1–4, the device 1 has a cylindrical cavity or coolant port 9 formed at an end portion thereof having a cavity axis 4 which is coincident with the device mounting plane 6 mentioned hereinabove. A pressurized manifold 11 is coupled between the cylindrical port 9 and passageway 5 formed beneath mirror 3, which passageway is utilized to cool the mirror which is deflecting high powered laser light. The laser mirror mounting device 1 is shown as rectangular, but could have another shape. The cooling fluid distributed under pressure within manifold 11, and which flows into passageway 5, travels in the direction of arrow 7 toward a like second terminal portion of the mounting device 1 not shown. Due to the geometrical configuration of the pressurized manifold 11, which is made apparent in FIGS. 2 and 3, vectors 8', representing the pressure center of all forces acting against the side walls of the manifold 11, illustrate the offset of the pressure center with respect to mounting plane 6, thereby forming moments M1 and M2 in FIG. 3, tending to bend device 1. This action induces bulging of mirror surface 3 indicated by dashed line 12 to produce an undesired distortion which will degrade the performance of the mirror. Fulcrum 2 schematically illustrates the positioning of the mounting plane and a clamp to support the mounting device, preferably at the center of gravity thereof. Thus, the liquid coolant, usually water, enters the cylindrical cooling port 9, flows in the direction illustrated by arrow 16, and is thereafter fed upwardly through manifold 11 to in turn flow to the left within the mirror cooling passageway 5. Side walls 27 and 29 of the manifold define a narrow diverging passageway through which the coolant is directed upwardly toward passageway 5. Cross sections of the device of FIG. 1 adjacent manifold 11 either to the right or to the left thereof, will result in the configuration illustrated in FIG. 4.

Figure 5:
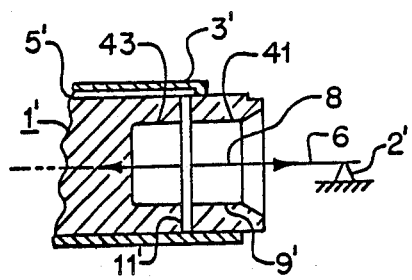
FIG. 5 illustrates a partial cross sectional view of the improved structure of the present invention.
Figure 2:
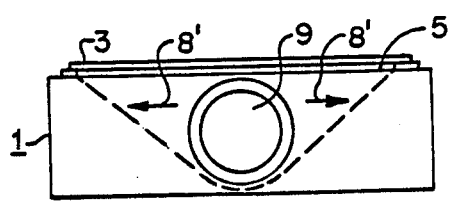
FIG. 2 illustrates an end view of such prior art structure.
Figure 6:
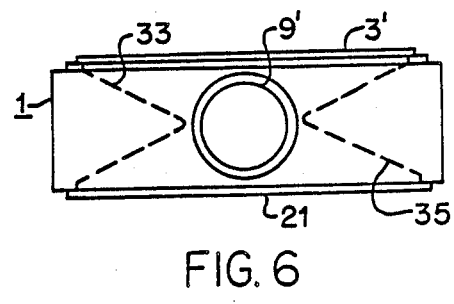
FIG. 6 illustrates an end view of such structure.
Figure 3:
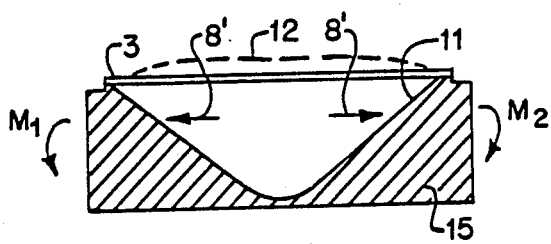
FIG. 3 illustrates a sectional view taken through the pressurized manifold illustrated in FIG. 1.
Figure 7:
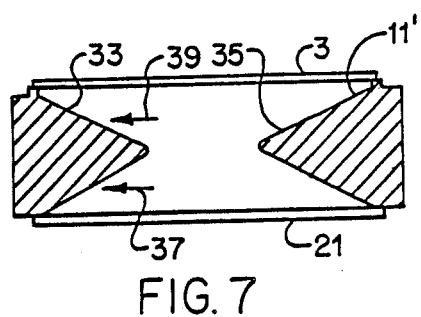
FIG. 7 illustrates a cross sectional view taken through the manifold 11' of FIG. 5.
Figure 4:
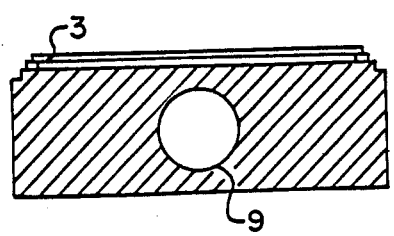
FIG. 4 illustrates a sectional view taken through portions of the prior art device adjacent the pressurized manifold either to the right or to the left thereof.

FIGS. 5–7 illustrate the improved manifold of this invention having a configuration symmetrical about the centralized mounting plane 6, to cause the pressure center illustrated by vector 8 to be moved downwardly to be positioned at the mounting plane thereby to eliminate the offsetting moments M1 and M2 mentioned above. The improved manifold of the present invention may be readily formed by a pair of triangular fluid guide members 33 and 35 illustrated in FIGS. 6 and 7. Fluid flows into the cylindrical input port 9' and is now distributed upwardly toward the fluid passageway 5' and at the same time is distributed downwardly so as to impinge upon closure plate 21 positioned at the lower portion of the mounting device. Since the fluid is entrapped in the lower portion of the manifold, best shown in FIG. 7, it will reverse direction and flow upwardly through the mirror cooling passageway 5'.

It may be observed that the pressure centers, represented by vectors 37 and 39 in FIG. 7 will now produce equal and opposite bending moments about mounting plane 6 to thereby eliminate bowing of the mirror. Thus fluid guide members 33 and 35 comprise triangular shaped guide members having their innermost portions or apexes positioned at the mounting plane. Cross sectional views taken at portions 41 and 43 of FIG. 5 will appear similar to the cross section of FIG. 4 previously described so that the symmetrical manifold comprises a relatively thin chamber for distributing the fluid upwardly toward mirror cooling passageway 5. The triangular fluid guide members defining manifold 11' may have other shapes. For example, these guide members could comprise semicircles whereby mirror image symmetry about the horizontal plane 6 is provided, to thus result in balanced pressure centers represented by vectors 37 and 39. Many other configurations could be provided providing that such mirror image symmetry results.

While there has been described what is at present considered to be the preferred embodiments of this invention, it will be obvious to those skilled in the art that various changes and modifications may be made therein without departing from the invention and it is, therefore, intended in the appended claims to cover all such changes and modifications as fall within the true spirit and scope of the invention, including art recognized equivalents.

What is claimed is:

1. In a laser mirror mounting device having a mounting plane including a mirror mounted upon said mounting device, offset from said mounting plane, coolant port means, and coolant passageway means for conducting coolant therethrough to draw heat from said mirror, the improvement comprising:
   coolant manifold means coupled between said coolant port means and said coolant passageway means, said coolant manifold means having a configuration symmetrical about said mounting plane, for substantially eliminating coolant induced bending moments about said centralized mounting plane.

2. The laser mirror mounting device of claim 1 including mirror support means mounted upon a first portion of said laser mirror mounting device, said first portion being separated from said mounting plane on one side thereof by a predetermined distance together with a coolant closure means separated from said mounting plane by said predetermined distance and positioned on an opposite side thereof for redirecting fluid back toward said mounting plane.

3. The laser mirror mounting device of claim 2 wherein said manifold means is bounded by a pair of fluid guide members having their innermost portions facing one another and positioned at said mounting plane.

4. The laser mirror mounting device of claim 3 wherein cross sections of said fluid guide members are triangular in shape, apexes thereof being positioned at said mounting plane.

5. The laser mirror mounting device of claim 4 wherein said coolant port means comprises a cylindrical cavity having its central longitudinal axis positioned at said mounting plane.

6. The laser mirror mounting device of claim 4 wherein said coolant port means comprises a cylindrical cavity having its central longitudinal axis positioned at said mounting plane.

7. The laser mirror mounting device of claim 2 wherein said coolant port means comprises a cylindrical cavity having its central longitudinal axis positioned at said mounting plane.

8. The laser mirror mounting device of claim 1 wherein said manifold means is bounded by a pair of fluid guide members having their innermost portions facing one another and positioned at said mounting plane.

9. The laser mirror mounting device of claim 3 wherein cross sections of said fluid guide members are triangular in shape, apexes thereof being positioned at said mounting plane.

10. The laser mirror mounting device of claim 5 wherein said coolant port means comprises a cylindrical cavity having its central longitudinal axis positioned at said mounting plane.

11. The laser mirror mounting device of claim 3 wherein said coolant port means comprises a cylindrical cavity having its central longitudinal axis positioned at said mounting plane.

12. The laser mirror mounting device of claim 1 wherein said coolant port means comprises a cylindrical cavity having its central longitudinal axis positioned at said mounting plane.

13. In a laser mirror mounting device having a centralized plane including a mirror mounted upon said mounting device, offset from said centralized plane, coolant port means, and coolant passageway means for conducting coolant therethrough to draw heat from said mirror, the improvement comprising:
   coolant manifold means coupled between said coolant port means and said coolant passageway means, said coolant manifold means configured to have mirror image symmetry about said mounting plane, for substantially eliminating coolant induced bending moments about said centralized mounting plane due to fluid pressure within said manifold.

14. The laser mirror mounting device of claim 13 including mirror support means mounted upon a first portion of said laser mirror mounting device, said first portion being separated from said mounting plane on one side thereof by a predetermined distance together with a coolant closure means separated from said mounting plane by said predetermined distance and positioned on an opposite side thereof for redirecting fluid back toward said mounting plane.

15. The laser mirror mounting device of claim 14 wherein said manifold means is bounded by a pair of fluid guide members having their innermost portions facing one another and positioned at said mounting plane.

16. The laser mirror mounting device of claim 15 wherein cross sections of said fluid guide members are triangular in shape, apexes thereof being positioned at said mounting plane.

17. The laser mirror mounting device of claim 16 wherein said coolant port means comprises a cylindrical cavity having its central longitudinal axis positioned at said mounting plane.

18. The laser mirror mounting device of claim 14 wherein said coolant port means comprises a cylindrical cavity having its central longitudinal axis positioned at said mounting plane.

19. The laser mirror mounting device of claim 13 wherein said manifold means is bounded by a pair of fluid guide members having their innermost portions facing one another and positioned at said mounting plane.

20. The laser mirror mounting device of claim 15 wherein cross sections of said fluid guide members are triangular in shape, apexes thereof being positioned at said mounting plane.

* * * * *